United States Patent [19]

Karger

[11] 4,419,334

[45] Dec. 6, 1983

[54] PROCESS FOR COOLING AND SEPARATING CHLORIDES AND FLUORIDES FROM GAS MIXTURES

[75] Inventor: Robert Karger, Dortmund, Fed. Rep. of Germany

[73] Assignee: Vereinigte Elektrizitätswerke Westfalen Aktiengesellschaft, Dortmund, Fed. Rep. of Germany

[21] Appl. No.: 318,920

[22] Filed: Nov. 6, 1981

[30] Foreign Application Priority Data

Nov. 17, 1980 [DE] Fed. Rep. of Germany ....... 3043329

[51] Int. Cl.³ .............................................. B01D 53/34
[52] U.S. Cl. .................................... 423/240; 423/351; 423/470; 423/481; 423/483
[58] Field of Search ............... 423/240, 470, 471, 241, 423/351, 481, 483

[56] References Cited

U.S. PATENT DOCUMENTS

| 4,038,369 | 7/1977 | Winston et al. | 423/240 |
| 4,213,945 | 7/1980 | Haese | 423/240 |
| 4,297,332 | 10/1981 | Tatani et al. | 423/240 |

Primary Examiner—Earl C. Thomas
Attorney, Agent, or Firm—Toren, McGeady and Stanger

[57] ABSTRACT

A method for the cooling and separation of chlorides and fluorides from hot mixtures of gases generated by the gasification of solid or liquid fuels or by extracting gas from solid fuels by cooling the gas mixture in the presence of a circulating liquid of ammonia and water in a cooler at a temperature below the adiabatic saturation temperature. This results in condensation of the steam contained in the gas and the formation, by sublimation of the gaseous ammonia, HCl or HF, of solid ammonium chloride or ammonium fluoride. These solids become dissolved in the condensed steam or the liquid circulated in the cooler and are then discharged from the cooler.

18 Claims, 2 Drawing Figures

PROCESS FOR COOLING AND SEPARATING CHLORIDES AND FLUORIDES FROM GAS MIXTURES

BACKGROUND OF THE INVENTION

1. Field of the Invention

The invention refers to a method and a plant for the cooling and selective separation of chlorides and fluorides out of hot mixtures of gases generated by gasifying solid or liquid fuels or by extracting gas from solid fuels.

2. Description of the Prior Art

The gas which occurs in the case of the extraction of gas from coal or the gasification of it contains besides the acid constituents $CO_2$, $H_2S$, HCN, inter alia HCl, HF and also $NH_3$, the concentration of which is dependent upon the coal used and the conditions of the process.

In the case of the preparation of gas for use as fuel or for synthesis, essentially physical or chemical wet washing processes are applied in order to remove the acid constituents. The prerequisite for the application of wet washing processes for desulphurizing and the removal of carbon dioxide is that the chlorides and fluorides are removed beforehand in order to keep the concentration of chlorides and fluorides in the washing circuit at justifiable values without discharges of washing liquor. The discharge of washing liquor must be avoided since the disposal of the amounts discharged, apart from the costs for the introduction of fresh lyes, can only be performed at considerable expense without burdening the environment. Further, the wet processes for desulphurization and the removal of carbon dioxide demands prior cooling down of the gases before entry to 30° to 100° C. and HCl in the gaseous phase form solid $NH_4Cl$ which is deposited upon the cooler surfaces and from time to time must be removed. Continuous operation with these heat-exchangers is therefore not possible.

Attempts have therefore already been made to cool the gas in washers directly by evaporation of $H_2O$ and in so doing at the same time to separate the chlorides and fluorides. For this purpose fresh water is fed into a washing circuit. The $NH_3$ present in the gas combines with the acid constituents of the gas, preferably with HCl and HF.

Besides the acid constituents the gas occuring the case of the extraction of gas from coal or gasification of it, also contains steam. In particular in the case of the pressure processes the steam contained in the gas condenses in the case of cooling of the gas down to, for example, 40° C. almost completely. The amount of condensate is then the amount of effluent which has to be discharged with the separated chlorides and fluorides. But in future effluents containing chlorides and fluorides must no longer be released into drainage ditches. But the removal of chlorides and fluorides from the effluent is possible practically only by evaporation which, however, demands considerable amounts of power.

In the case of direct cooling by evaporation of water out of drops of solution, particularly in the case of a high concentration of ammonium chloride and the temperatures which are here being striven for, ammonium chloride aerosols come into existence. These aerosols originating from the liquid phase can only be separated again with difficulty, for example, in a washer having a high pressure drop or in wet electrostatic filters. In the case of the direct cooling by a cooler in the liquid circuit down to below the adiabatic saturation temperature, which demands very high liquid/gas ratios, ammonia, hydrochloric acid and hydrofluoric acid are preferably separated by absorption into the liquid in the circuit. But the absorption effect worsens with rising temperature in the liquid circuit.

SUMMARY OF THE INVENTION

The problem underlying the invention is therefore to create a method and a plant in order to separate selectively the chlorides and fluorides contained in the gas mixture and in doing so to convert them into a small amount of a highly concentrated solution which can be further prepared at small expense without the danger existing of the depositing of sublimed ammonium chloride and fluoride upon the cooling surfaces.

This problem is solved by the gas mixture being cooled in the presence of ammonia and water in a cooler, at least down to the temperature corresponding with the adiabatic saturation temperature, and by sublimation of ammonia and hydrochloric acid or hydrofluoric acid respectively in the gaseous phase, solid ammonium chloride and fluoride being formed, and also a part of the latter getting dissolved in its own condensate or respectively in the liquid in circulation and discharged from the cooler. The method in accordance with the invention is aimed at cooling down the gas mixture during the removal of the chlorides and fluorides only so far that only a small part of the steam contained in the gas condenses in order to obtain an effluent containing chlorides and fluorides. The correspondingly small amount of effluent having a high chloride concentration can then be evaporated at economically justifiable expense. Upon further cooling of the gas mixture down to, for example, 40° C. a second but chloride-free flow of effluent results.

DESCRIPTION OF THE PREFERRED EMBODIMENT

Figure 1:
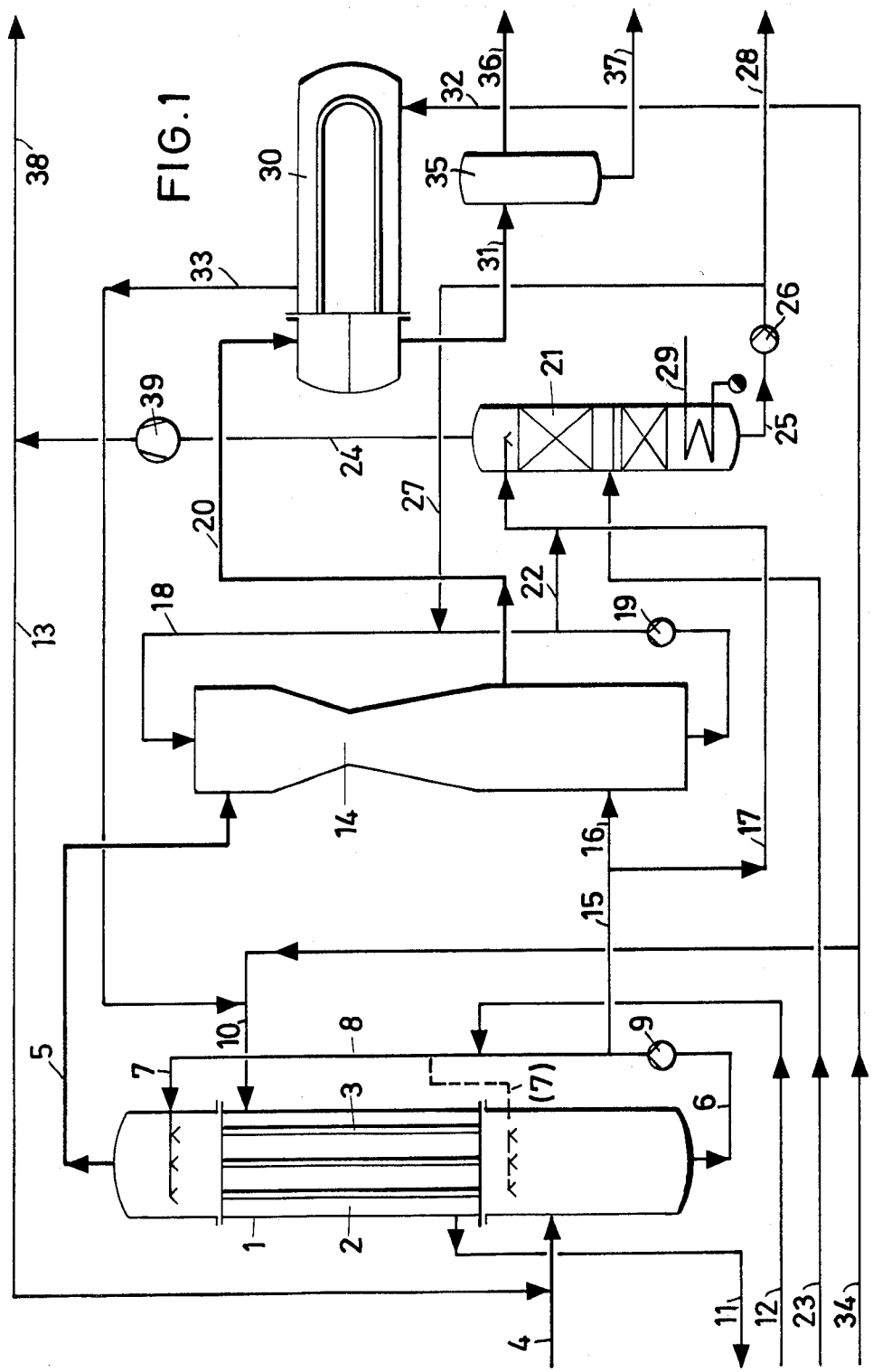
FIG. 1 is a flow diagram of a plant in accordance with the present invention.

In order to guarantee, besides the separation of the chlorides and fluorides, a small flow of effluent having a high chloride content, in the case of the methods hitherto a high chloride concentration had inevitably to be employed in the circuit of the direct cooler. Because of the small amount of effluent and the inevitable condensation of the steam, particularly in the case of the pressure methods high temperatures had to be set at the outlet from the direct cooler and thereby in the liquid circuit.

Preferably the gas mixture contains at least the stoichiometric amount of ammonia, referred to hydrochloric acid and hydrofluoric acid. This is advantageously achieved by the feeding back of ammonia out of the still.

Corresponding with the equilibrium of decomposition of the ammonium chloride, even at temperatures of the order of magnitude of 100° C. the partial pressures of the ammonia and of the hydrochloric acid are still low. Particularly in the case of a procedure under pressure, in the case of these partial pressures adequately low contents of hydrochloric acid (ppm) result in the gas phase. The partial pressure at the start and the end of the cooling corresponds with the amount of solid ammonium chloride.

By cooling the gas at the smallest possible mass exchange areas in the form of the ammonium chloride solution, the separation of hydrochloric acid out of gases containing ammonia becomes a problem of dust extraction.

When the gas mixture is cooled in the presence of ammonia and water in a cooler down to below the temperature corresponding with the adiabatic saturation temperature, the steam contained in the gas condenses to correspond with the gas outlet temperature which is predetermined, for example, by the maximum permissible amount of effluent containing chlorides. The liquid in the circuit which is led into the cooler and/or the inherent condensate which occurs during the cooling, prevents the deposit of solid ammonium chloride upon the cooler surfaces. Part of the solid ammonium chloride is dissolved in the film of liquid. Through the cooling of the gas mixture in a heat-exchanger the sensible heat in the gas at a significant temperature level may be partially recovered.

Since, in contrast to direct cooling, the indirect cooler offers a considerably smaller mass exchange area with reference to the liquid, for $NH_4Cl_{(f)}$, $NH_{4(f)}$, HCl, HF and $NH_3$, only correspondingly small amounts can be absorbed from the liquid circuit. This is particularly advantageous, since ammonia and hydrochloric acid sublime in the gas phase and solid ammonium chloride is deliberately deposited in the succeeding washer. Lower ammonium chloride concentrations thereby result in the liquid circuit of the cooler, and even in the case of the higher temperatures which are striven for a correspondingly lower formation of ammonium chloride aerosols occurs out of the liquid phase. The solid ammonium chloride occuring in the gas phase can because of its greater particle size be deposited better than the ammonium chloride aerosols arising out of the liquid phase.

The amount of discharge set by the gas outlet temperature from the cooler corresponds with the amount of steam condensed out of the gas mixture. The discharge flow from the cooler corresponds with the amount of effluent discharged from the auxiliary washer/still circuit. In the liquid circuit of the succeeding washer the chloride concentration in the effluent is set. This must be as high as possible so that the chlorides contained in the effluent may economically be discharged as dry salt compounds ($NH_4Cl$, $NaCl$, $CaCl_2$) from the overall process.

If the gas mixture which is to be treated contains no steam, fresh water must be fed to the cooler. The amount of fresh water being fed in corresponds with the amount of chloride-containing effluent or discharge respectively and the amount of steam absorbed from the gas at the outlet from the cooler. But in this case the gas outlet temperature is set as low as possible.

In order to extract from the gas mixture the solid ammonium chloride and fluoride which is carried along with it but not dissolved in the liquid film in the cooler as well as the chlorides and fluorides not converted by sublimation, the gas mixture is fed beyond the cooler to a washer. The liquid circuit in the washer is operated at a temperature which corresponds with the temperature of the residual gas mixture leaving the cooler. The temperature of the liquid circuit so established is sufficiently high for the further gases existing in the gas mixture, like sulphuretted hydrogen and carbon dioxide, not to get absorbed in the washer.

If the liquid circuit of the washer is to be run with an ammonium chloride solution, there is fed to the washer as washing liquid at least part of the solution discharged from the cooler, which preferably is circulated in the closed circuit. Correspondingly an amount of solution is discharged from the circuit of the washer, which corresponds with the amount of solution fed from the cooler.

The solution discharged from the washer circuit may be fed to a still and be treated in it with calcium hydroxide and/or sodium hydroxide so that sodium or respectively calcium chloride or respectively fluoride and ammonia result. The ammonia occurring in the still may be fed to the gas mixture before the cooler and/or the gasifier or gas extractor respectively.

Moreover at least part of the solution discharged from the cooler circuit is fed to the still, whilst part of the solution discharged from the still gets fed back to the washer. For the thermal decomposition of the volatile ammonium compounds and for concentration of the solution the still may in addition be heated and be made as a distillation column. The calcium hydroxide solution or respectively the soda lye is in that case added in a second stage after driving off the volatile salt compounds.

In dependence upon the temperature necessary for the further treatment of the gas mixture, the gas mixture may beyond the washer be fed to a further cooler. A separator arranged beyond the cooler allows the remaining water condensed out of the gas mixture to be separated, which because of its only extremely small content of fluorides and chlorides can run into the drainage ditches.

As a rule, because of the residual content of chlorides demanded in the purified gas the liquid circuit of the washer must be run as a calcium chloride or sodium chloride solution. In this case the amount of solution discharged from the cooler gets led directly to the still.

The washer is connected to the still via an auxiliary circuit. Pipes from the washer and from the cooler to the still, a return from the still to the washer, as well as the discharge from the return pipe, make it possible that the solution discharged from the cooler can be fed to the still both indirectly via the washer and also directly.

In the first stage of the still the volatile ammonium compounds are decomposed by heat and driven off. Before the entry of the solution into the second stage the ammonium chloride is converted by calcium hydroxide or soda lye respectively into calcium chloride or sodium chloride respectively with the release of ammonia. In the second stage the free ammonia is then driven off out of the solution. The heating of the still is effected indirectly by steam. The ammonia gas which has occurred in the still may be fed via a compressor or dissolved in water and fed via a pump to the gas mixture before the cooler and/or the gasifier or gas extractor respectively.

In the case of adequately large amounts of flow in the auxiliary washer/still circuit and through the conversion, the concentration of ammonium chloride in the washer circuit may be set by the auxiliary circuit to small values with at the same time high calcium chloride or respectively sodium chloride concentrations. Thereby in the solution in the circuit of the washer even at higher temperatures low partial pressures may be set above the solution in the circuit.

The amount of effluent which corresponds with the amount of steam condensed out in the cooler, is at a higher chloride concentration discharge from the return of the auxiliary washer/still circuit. In dependence upon the temperature necessary for the further treatment of the gas mixture, the gas mixture may be fed beyond the washer to a further cooler. A separator arranged beyond this cooler allows the condensed residual water to be separated from the gas mixture and this water because of its only extremely low content of fluorides and chlorides, after it has, for example, been led via an effluent stripper, may be released into the drainage ditches.

In order to prevent the occurrence of aerosols in the cooler and the depositing of sublimed ammonium chloride or fluoride upon the cooler surfaces, it is important that by the water or respectively the solution running through the cooler a closed liquid film is set up over the cooling surfaces.

A plant for the performance of the method in accordance with the invention consists of a columnlike cooler having a heat-exchanger arranged about in the middle region, a gas mixture feedpipe, a gas mixture delivery pipe and a liquid delivery pipe underneath the heat-exchanger. The liquid flowing along the heat-exchanger surfaces in contraflow or parallel flow to the gas mixture, consists either of inherent condensate and/or liquid from the circuit or respectively is fed in as fresh water, for which purpose a liquid feedpipe may be arranged above or below the heat-exchanger. The concentration of chlorides and fluorides in the solution in the circuit is adjusted by its degree of separation and the amount of discharge. The cooler may in certain cases be replaced by a direct cooler. But in this case the liquid/gas ratio and the guidance of the liquid must be matched to the high temperature in the liquid circuit. In a similar way to the washer, low ammonium chloride concentrations would then be set in the liquid circuit of the direct cooler through a return of solution from the still.

A succeeding washer is preferably made as a venturi washer and exhibits a connecting pipe to the liquid circuit of the cooler. The washer also has a circulating pipe with a circulating pump for the washing liquid in a similar way to the cooler.

An embodiment of a plant in accordance with the invention is described below with the aid of a flow diagram illustrated in the drawing.

In the case of the guidance of the film of liquid over the cooler surfaces in contraflow to the gas, the plant in accordance with the invention consists of a columnlike cooler 1 having a heat-exchanger 2 arranged in the middle region, having cooling surfaces 3 over which flows the gas which is to be treated. The gas mixture is fed to the cooler 1 underneath the heat-exchanger 2 via a gas mixture feedpipe 4, flows along the cooling surfaces 3 of the heat-exchanger 2, enters a free space above the heat-exchanger 2 and leaves it in a gas mixture delivery pipe 5. At the bottom end of the cooler 1 there is a liquid delivery pipe 6, whilst at the top end or respectively at the bottom end a liquid feedpipe 7 opens out, which is connected to the liquid delivery pipe 6 via a pipe 8 with a circulating pump 9.

Cooling medium fed via a main cooling medium pipe 34 comes via a cooling medium feedpipe 10 into the heat-exchanger 2 and is led away through the cooling medium delivery pipe 11. Boiler feed water or heating oil are suitable as the cooling medium in order to recover the sensible heat contained in the gas mixture. A fresh water feedpipe 12 connected to the connecting pipe 8 serves to feed fresh water into the circuit in the event that in the gas mixture fed in via the pipe 4 there is contained insufficient condensable steam.

The sublimation of the fluorides and chlorides contained in the gas mixture, effected with ammonia, takes place at the temperature of the gas mixture in cooler 1.

The solid ammonium chloride thereby arising is dissolved and conveyed away by the liquid guided as a film over the cooling surfaces 3.

In the case of low water contents in the gas mixture, by feeding in fresh water via the fresh water feedpipe 12 into the liquid circuit 6,9,8,7, the amount of liquid discharged via a pipe 15 and thereby its concentration may be altered. The ammonia content in the gas mixture before entry into the cooler 1 can be increased by feeding in ammonia gas or respectively ammonia water via an ammonia feedpipe 13. Chloride and fluoride not dissolved in the film of liquid on the cooling surfaces 3 as well as hydrochloric acid and hydrofluoric acid in the cooler 1, not converted by sublimation, are separated in a succeeding washer, preferably a venturi washer 14. For this purpose the gas mixture is fed via the gas mixture delivery pipe 5 to the venturi washer 14. Via the discharge pipe 15 the liquid led out of the cooler is either fed as washing solution via a connecting pipe 16 into the venturi washer 14, or led directly via the connecting pipe 17 to the still 21. The washing solution is fed via a circulating pipe 18 by means of circulation pump 19 in the cycle through the Venturi washer 14.

If in the gas mixture leaving the venturi washer 14 very low chloride and fluoride contents must be guaranteed, starting from the pipe 15 the solution which is to be discharged is fed by the connecting pipe 17 to the still 21. At the same time the auxiliary circuit from the washer is being carried by the pipes 22 and 27. A return load, not shown here, is possible from the still 21 to the cooler circuit 8. Calcium hydroxide solution or respectively soda lye is added to the still 21 via a pipe 23, and are converted by the ammonium chloride or respectively fluoride into sodium or respectively calcium chloride or respectively fluoride and ammonia.

The ammonia which is released may be fed via an ammonia delivery pipe 24 and a compressor 39 (only if the cooler 1 is operated under pressure) to the ammonia feedpipe 13 and thereby to the gas mixture feedpipe 4 or else be returned via an ammonia pipe 38 to the gasifier or gas extractor respectively. In order that the released ammonia which is led into the pipe 24 does not have to be compressed, it may be dissolved in a partial flow of condensate from the pipe 37 and pumped as ammonia water to the gas mixture pipe 4.

The partial discharge amount which is drawn off by means of a pump 26 from the still 21 via the discharge pipe 25 and fed by the return pipe 27 to the washing circuit of the venturi washer 14, corresponds with the amount removed from the washing circuit by the pipe 22, whilst the remainder of the amount discharged forms the effluent and gets carried away via a pipe 28 to the further thermal preparation. The concentration of the amount of liquid carried away by the pipe 28 is so high that spray drying or evaporation of the liquid is possible in an economically justifiable way.

In the venturi washer 14 the gas mixture fed via the pipe 5 is not cooled down any further, so that the gas in the gas mixture outlet pipe 20 and the liquid in the circulating pipe 18 display approximately the same temperature as the gas mixture in the pipe 5. In that way no additional water gets condensed out of the gas mixture in the venturi washer 14. By a heater device 29 in the still 21 the free ammonia contained in the solution and the volatile ammonium compounds which can be decomposed by heat, get driven off. Through the small discharge amounts and the relatively high temperature in the liquid circuit 18 of the venturi washer 14 the absorption of the other gas constituents such as sulphuretted hydrogen and carbon dioxide is very largely suppressed.

Because of the separation of the chlorides and fluorides in the cooler 1 and in the venturi washer 14 the gas mixture escaping from the venturi washer 14 through the pipe 20 is nearly free of gas constituents which during the further cooling down of the gas would not form recoverable salts.

The further cooling of the gas mixture may be cooled down further in an additional cooler 30 to the inlet temperature for a succeeding step of the process, e.g., of a desulphurization process which is connected to the pipe 36. Cooling medium from the main cooling medium line 34 via a branch cooling medium inlet line 32 is fed to the cooler 30. The cooling medium reaches the heat exchanger 2 by means of cooling medium removal line 33. The gas mixture is fed via a pipe 31 to a separator 35 where the water condensed and separated from the gas is collected and led away via a discharge pipe 37. The flow of effluent escaping through the discharge pipe 37 contains besides extremely low amounts of chlorides and fluorides only salts which can be recovered by heat and which are removed by stripping with steam and/or by precipitation out of the effluent which after that may be admitted into a drainage ditch.

Figure 2:
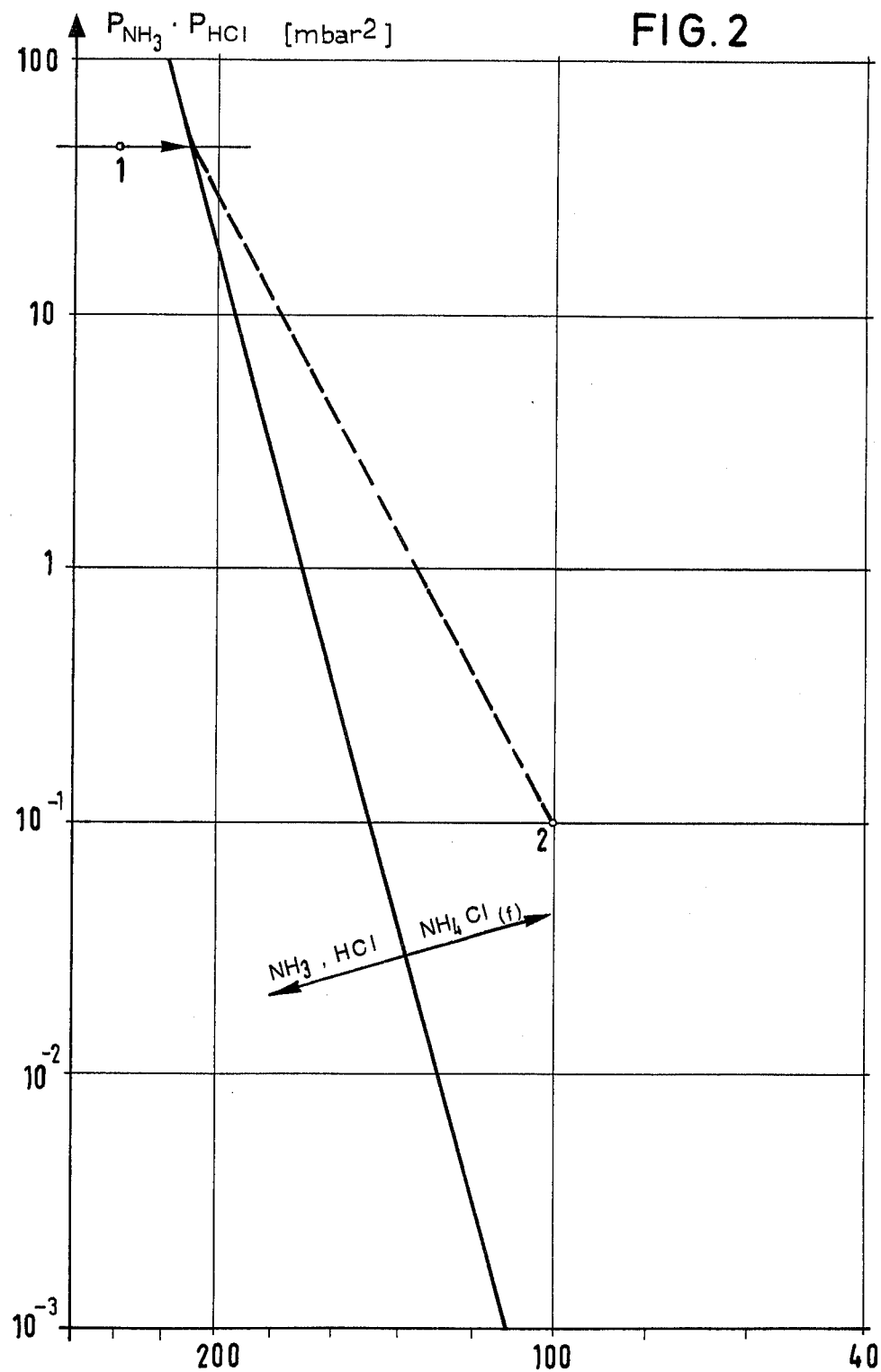
FIG. 2 shows a graph of the equilibrium of the decomposition of ammonium chloride.

The equilibrium decomposition of the ammonium chloride (solid straight line)$P_{NH_3} \cdot P_{HCl}$ as f (t) in the graph of FIG. 2 holds for the gas/solid system.

During the cooling of a gas containing ammonia and hydrochloric acid without condensation of steam and the formation of an aqueous ammonium chloride solution, ammonia and hydrochloric acid sublimed to correspond with the solid straight line.

In practice such cooling cannot be carried out in continuous operation, since the cooling surfaces would get clogged with sublimed ammonium chloride.

But if the sublimation is done in the gas/ammonium chloride solution system, for example, in a cooler having a liquid film over the cooling surfaces or a direct cooler with the liquid being carried along in the circuit, the sublimation does not proceed according to the solid straight line but according to the dotted line (from P.1 to P.2).

The end point of this dotted straight line lies at a given temperature between the equilibrium of decomposition of the gas/solid system and the partial pressure curves at the ammonium chloride solutions. The aforesaid end point approaches the closer to the partial pressure curves, the greater the area of contact between the gas phase and the liquid phase.

The approach of the end point to the partial pressure curves influences the degree of conversion of ammonia and hydrochloric acid into solid ammonium chloride in the gas phase and is of advantage particularly in the case of the temperatures which are here being striven for at the outlet from a cooling system, of about 90° to 110° C. In this case a small area of contact between the gas phase and the liquid phase is necessary during the cooling, as is possible in the case of the cooler illustrated.

The conversion of ammonia and hydrochloric acid into solid ammonium chloride in the gas phase is not to be confused with the chloride separated out of the gas. The degree of separation of the chloride in the direct cooler is indeed greater than in the cooler illustrated, since already more sublimed ammonium chloride gets dissolved in the liquid, but not adequately.

Since ammonia and hydrochloric acid react both in the gas phase and also in aqueous solution, in an absorption system for ammonia and hydrochloric acid the sublimation and the individual partial pressures above the aqueous ammonium chloride solution influence one another mutually, the influence of the individual partial pressures above the solution being decisive. At the abovementioned temperatures of 90° to 110° C. and in addition at a high ammonium chloride concentration, even in the case of elaborate absorption systems later purification stages are necessary for the chlorides which have not been separated. It is therefore wise to convert the hydrochloric acid contained in the gas almost completely into solid ammonium chloride by sublimation in the gas phase and then deliberately to separate it into an aqueous solution by a washer.

As regards the individual partial pressures of the ammonia and the hydrochloric acid above ammonium chloride solutions and the disposal of chloride-containing effluent, the aqueous solution in the liquid circuit has a high calcium chloride or respectively sodium chloride content with a low proportion of ammonium chloride.

What is claimed is:

1. A method for cooling and selective separation of chlorides and fluorides from hot mixtures of gases generated by gasifying solid or liquid fuels or by extracting gas from solid fuels comprising cooling the gas mixture in the presence of a circulating liquid of ammonia and water in a cooler to a temperature at or below the adiabatic saturation temperature to condense the steam contained in said gas and forming, by sublimation of gaseous $NH_3$, HCl or HF, solid ammonium chloride and ammonium fluoride, and wherein a part of said solids is dissolved in the condensed steam or, respectively, in the circulation liquid, and discharging the dissolved material from the cooler.

2. A method as in claim 1, characterized in that upon entry
    of the gas mixture into the cooler ammonia is added to it in at least the stoichiometric amount referred to HCl and HF.

3. A method as in claim 2, characterized in that the
    temperature at the outlet from the cooler is chosen to be at such a level that only part of the steam contained in the gas at the inlet condenses and the absorption of the other acid gaseous constituents contained in the gas is suppressed.

4. A method as in claim 2 or 3, characterized in that in
    the case of mixtures of gases containing steam the amount of discharge is at least equal to the amount of water condensed.

5. A method as in claim 2 or 3, characterized in that the amount of discharge is at least equal to an amount of fresh water fed in.

6. A method as in claim 2 or 3, characterized in that the ammonium chloride and fluoride solution is circulated in the cooler in a closed circuit.

7. A method as in claim 2 or 3, characterized in that the gas mixture remaining after the cooler and containing the chlorides and fluorides essentially in the form of solid ammonium chloride and fluoride, is fed to a washer.

8. A method as in claim 7, characterized in that at least
part of the solution discharged from the cooler is fed to the washer.

9. A method as in claim 8, characterized in that the
solution fed to the washer is circulated as wash liquid in a closed circuit.

10. A method as in claim 9, characterized in that an amount
of solution corresponding with amounts of solution fed to the cooler, is discharged from the washer circuit.

11. A method as in claim 10, characterized in that the
solution discharged from the cooler circuit and/or the washer circuit is fed to a still and reacted with $Ca(OH)_2$ and/or $Na(OH)$.

12. A method as in claim 2 or 11, characterized in that
ammonia is produced in a still and is fed to the gas mixture before the cooler or the gasifier or gas extractor respectively, as gas or $NH_3$-water.

13. A method as in claim 11, characterized in that
at least part of the solution discharged from the cooler circuit is fed to the still and part of the solution discharged from the still gets fed back to the washer.

14. A method as in claim 7,
characterized in that by the auxiliary washer/still circuit the concentration of ammonium chloride in the liquid circuit of the washer may be set independently of the overall concentration of chlorides.

15. A method as in claim 14, characterized in that
the still is heated for the thermal decomposition of the volatile salt compounds and the calcium hydroxide solution or respectively the soda lye is added in a second stage after driving off the volatile salt compounds.

16. A method as in claim 15, characterized in that the
chloride-containing effluent discharged from the still is fed to a further treatment.

17. A method as in claim 7,
characterized in that the gas mixture from the washer is fed to a further cooler and after that to a separator for the separation of the gas mixture from the condensed remainder of the steam contained in the gas at entry into the plant.

18. A method as in claims 2 or 3,
characterized in that by the water or respectively the solution running through the cooler a closed liquid film is set up over the cooling surfaces.

* * * * *